Jan. 11, 1938.  W. H. WELCH  2,105,237
METAL CUTTING MACHINE
Filed Dec. 29, 1936  3 Sheets-Sheet 1
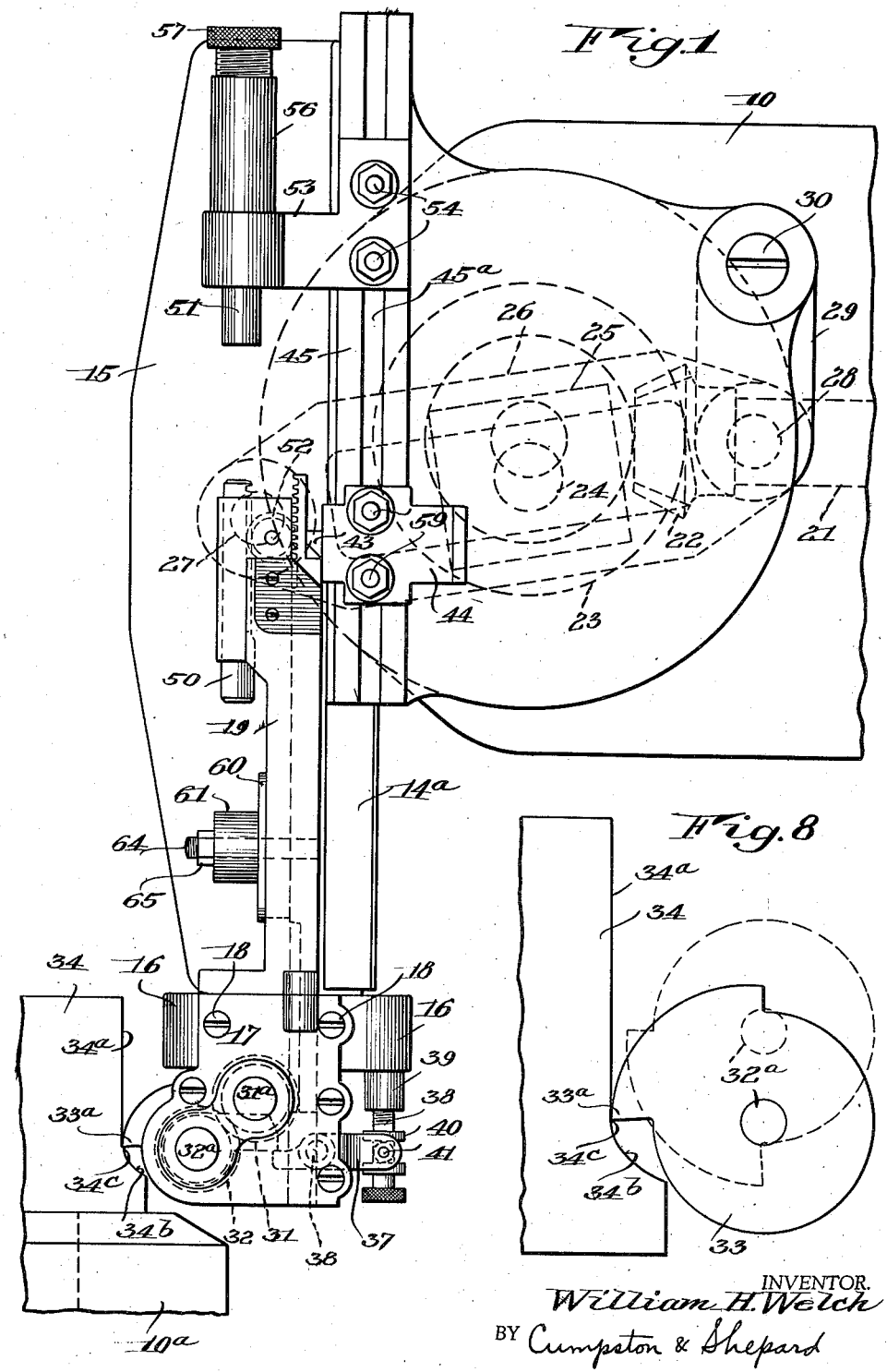
INVENTOR.
William H. Welch
BY Cumpston & Shepard
his ATTORNEYS

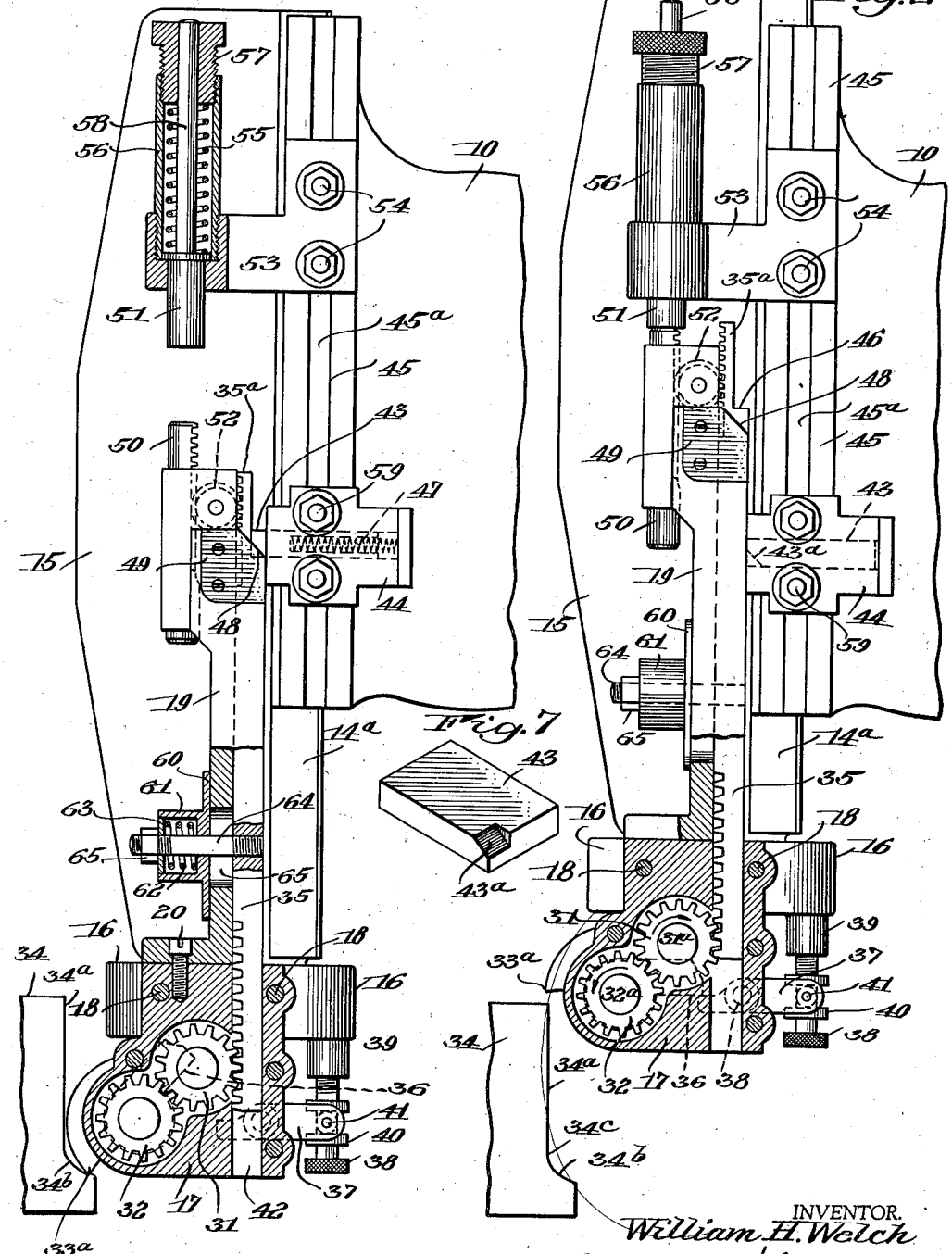

Jan. 11, 1938.  W. H. WELCH  2,105,237
METAL CUTTING MACHINE
Filed Dec. 29, 1936  3 Sheets-Sheet 3

INVENTOR.
William H. Welch
BY Cumpston & Shepard
his ATTORNEYS

Patented Jan. 11, 1938

2,105,237

UNITED STATES PATENT OFFICE 2,105,237

METAL CUTTING MACHINE

William H. Welch, Rochester, N. Y., assignor to Cochrane-Bly Company, Rochester, N. Y., a corporation of New York Application December 29, 1936, Serial No. 118,071

24 Claims. (Cl. 90—24)

The present invention relates to metal cutting machines and has for its object to provide improvements in machines of this class whereby to both increase their output and to reduce the cost of operation below that of machines heretofore employed for performing the same or similar operations.

A further object of the invention is to provide in a machine of the class described, improved mechanism for performing, by the use of a single tool at one operation, certain classes of work which have heretofore required different tools and a greater number of operations to accomplish the desired results.

A further object of the invention is to provide improved means for operating a tool in a manner to perform a complete operation without having to pre-condition the work to provide for tool clearance.

A further object of the invention is to provide in a machine of the class described, improved tool operating means including means for changing the direction of movement of the tool while continuing movement of the operating means and without interrupting the cutting stroke of the tool.

A further object of the invention is to provide improved reciprocating means for operating the tool, in combination with means for changing the direction of movement of the tool and for continuing movement of the same in operative engagement with the work for a portion of the return stroke of the reciprocating means during which stroke the tool is made to clear the work.

A further object of the invention is to provide improved tool supporting and operating means for moving the tool to successively produce linear and rotary cutting movements thereof during one operation.

A further object of the invention is to provide for use on planing, shaping, and other metal cutting machines and in combination with work supporting and indexing mechanisms, means for operating a tool in engagement with the work to produce, at one operation, a combined linear and curved cutting stroke whereby the work may be shaped as desired and the tool made to clear the same at the end of each stroke.

A further object of the invention is to provide an improved machine of the class described in which the tool operating means is of simple and compact construction, comprising relatively few parts and in which the cutting tool is designed to operate on a variety of different kinds of work.

To these and other ends the invention resides in certain improvements and combinations of parts, all as will be hereinafter more fully described, the novel features being pointed out in the claims at the end of the specification.

In the drawings:

Fig. 1 is a view in elevation of a machine embodying one form of the invention with the cutting tool shown at the end of its linear stroke;

Fig. 2 is a somewhat similar view with a portion of the tool driving means shown in section and with the tool at initial starting position;

Fig. 3 is a view similar to Fig. 2 with additional parts shown in section and with the rotary cutting stroke of the tool partially completed;

Fig. 7 is a perspective view of the rack-holding or locking member shown in Figs. 5 and 6, and Fig. 8 is a diagrammatic view illustrating the extent of the rotary cutting movement of the tool which takes place when reversing and returning the ram to initial starting position.

The same reference numerals throughout the several views indicate the same parts.

The present invention embodies improved tool supporting and operating means for use with shaping, planing, and other types of metal cutting machines, which may be provided with suitable work supporting and indexing mechanisms or any preferred means for adjustably supporting or moving the work relative to the cutting tool at the completion of each cutting stroke as may be required.

The tool is mounted and operated in such a manner that it will complete its stroke and clear the work without having to employ additional cutting means to perform the usual preliminary cutting operations to provide clearance for the tool. In other words the tool is held against movement relative to the reciprocating support while moving the latter in one direction during which time the tool will produce a straight or linear cut. However, upon reversing the movement of the support, the tool will automatically begin to rotate with the result that its movement is continued in a curved path whereby the tool is permitted to clear the work as shown, for example, by dotted lines in Fig. 8. Thus the necessity for operating upon the work to provide the usual preliminary cuts at the points at which it is desired to stop the tool is avoided, which results in a saving of the time required to make such cuts and the cost of the operations as well.

Figure 4:
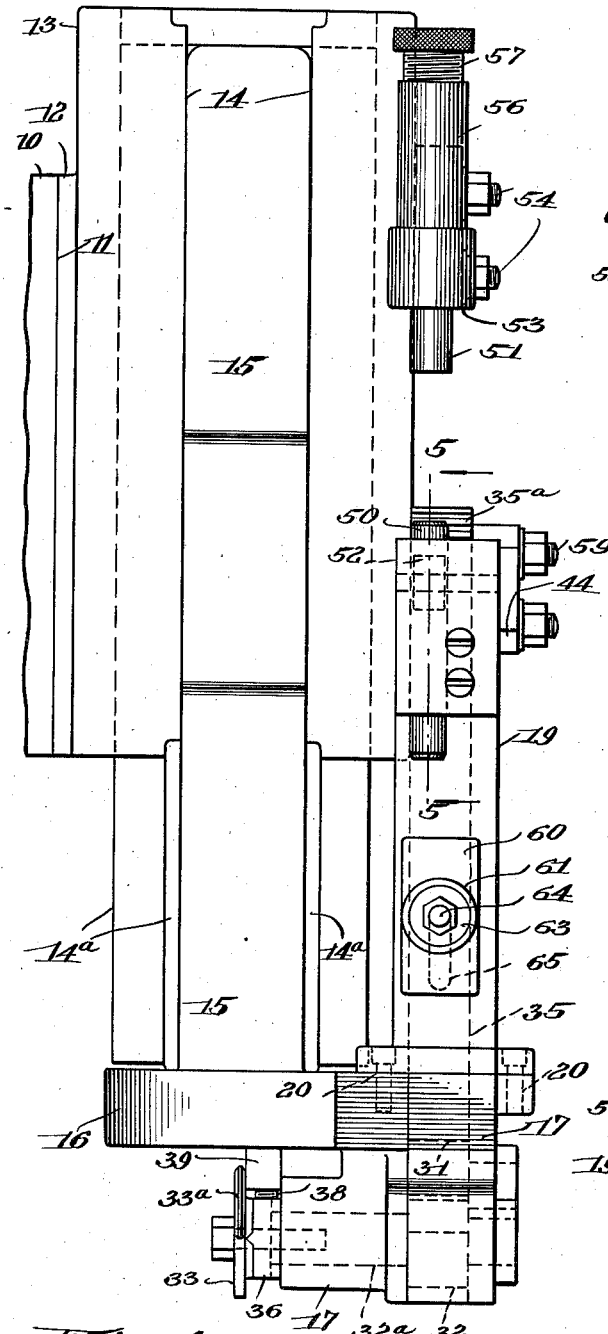
Fig. 4 is a side elevation as viewed from the left of Fig. 1 with the work omitted.
Figure 5:
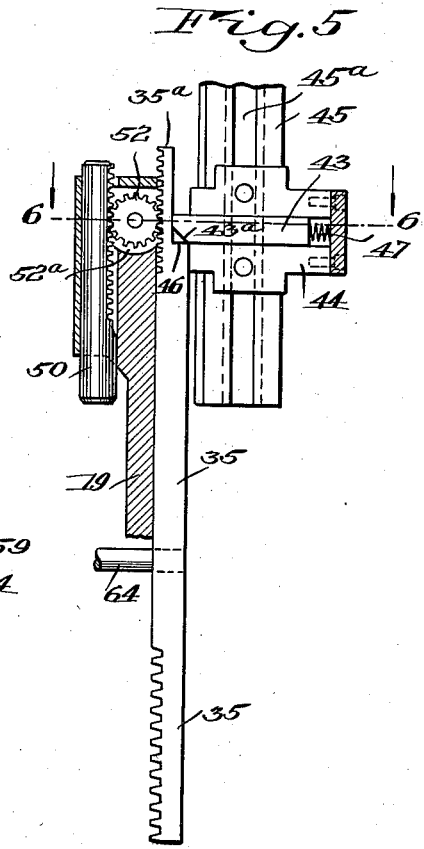
Fig. 5 is a fragmentary sectional elevation showing the locking means for holding the gear operating rack against movement during rotation of the tool in engagement with the work.

Referring to the drawings, 10 designates a portion of a universal shaper or other metal cutting machine having a bearing surface 11 on which is seated the disk-like portion 12 of a head or frame 13 provided with ways 14 including extensions 14a projecting below the head as shown, for example, in Figs. 1 and 4 of the drawings.

Mounted for reciprocation on said head and between the ways is a ram or support 15 having at its lower end an enlarged horizontally disposed portion 16 to which is suitably secured a gear casing 17 as by means of the screws 18, Figs. 1 and 3, said casing containing gears for operating the tool in a manner described hereinafter.

Superimposed on the gear casing is a bracket 19, the upper end of which is suitably connected with the ram or support 15. The lower end of the bracket is connected with the gear casing by means of a plurality of screws 20, as shown in Figs. 3 and 4.

Reciprocation of the ram and the gear casing may be effected by any suitable means such, for example, as the operating shaft 21, the pinion 22 thereon, and the ring gear 23, shown by dotted lines in Fig. 1. The ring gear is suitably supported for rotation on the frame and has a crank 24 journaled in a block or cross-head 25 slidably mounted in a yoke 26, the outer end of which is pivotally connected with the ram at 27 and the inner end of which is pivotally connected at 28 with a short link 29, pivoted on the frame at 30, as shown in Fig. 1.

It will be understood that rotation of the ring gear 23 and crank 24 will serve to raise and lower the cross-head 25, which in turn will raise and lower the yoke to effect reciprocation of the ram or support 15, the link 29 permitting the yoke to move inwardly and outwardly whereby to accommodate the ram or support to the ways upon which it is mounted for reciprocation.

Mounted within the casing 17 are a pair of gears 31 and 32 having supporting shafts 31a and 32a, respectively, the opposite ends of which are journaled in the walls of the casing. The shaft 32a has fixed on one end thereof a cutting tool 33, the cutting point of which is indicated at 33a on the segmental portion of the tool as shown in Figs. 1 and 8. The tool upon being moved downwardly from the position shown in Fig. 2 will operate upon the work 34 to first produce a linear cut 34a during which time the tool will be held in fixed relation relative to the ram by means described hereinafter.

Upon reversing the ram at the position shown in Fig. 1 to return it to initial starting position the tool will be rotated by the gears, through cooperation with the rack 35 as described hereinafter, with the result that the point of the tool, during the remainder of the cutting stroke, will move in a curved path generally indicated at 34b, during which movement the tool will clear the work and return to normal position relative to the ram as shown by dotted lines in Fig. 8.

The means for holding the tool against rotation during downward movement of the ram comprises an arm 36 fixed on the gear shaft 32a between the tool and the gear casing and resting on the inner end of a lever 37 pivoted at 38 on the gear casing as shown in Figs. 1 and 2. The lever is made adjustable to properly adjust the cutting point of the tool relative to the work, this being done by providing an adjusting screw 38 which is threaded within a boss 39 on the horizontal portion 16 of the ram, the screw having spaced collars 40 thereon between which are disposed a pair of rollers, not shown, each having a pintle 41 journaled in one of the jaws of the lever whereby the rollers are free to rotate between said collars upon turning the screw, either to raise or lower the inner end of the lever whereby to vary the position of the arm 36 in order to effect the desired adjustment of the tool.

The rack for operating the gears to rotate the tool during the return movement of the ram is slidably mounted in a vertically disposed guideway formed in the rear side of the bracket 19 for supporting the gear housing 17, the lower end of the rack being extended within an opening 42 of the gear housing and meshing with the teeth of the gear 31 as shown in Figs. 2 and 3. In moving the ram downwardly from the position shown in Fig. 2 to that shown in Fig. 1 there will be no movement of the tool relative to the ram since the gears 31 and 32 will be held against rotation at this time by engagement of the arm 36 with the stop lever 37. However at or about the time the ram reaches the position shown in Fig. 1 a detent 43, slidably disposed within a housing 44 on the vertical portion 45 of the frame, will be moved into engagement with the shoulder 46 of the rack by the springs 47, thus locking the rack against movement relative to the frame. Consequently, upon upward movement of the ram from the position shown in Fig. 1, the rack, by reason of the fact that it is held against movement will effect rotation of the upper gear 31, which in turn will rotate the lower gear 32 to effect rotation of the tool from the position shown in Fig. 1 to the dotted line position shown in Fig. 8 whereby to complete the cutting stroke of the tool and to move it clear of the work. During this movement the arm 36 on the tool operating shaft 32a will swing upwardly from the operating position shown in Fig. 1 to that shown by dotted lines in Fig. 3. Upon continued upward movement of the ram after the tool has moved out of engagement with the work a cam 48 on a member 49 attached to the ram will engage the beveled portion 43a of the detent 43 to release the latter by moving it inwardly of the housing 44 to the position shown by dotted lines in Fig. 2. As the ram continues to move upwardly the tool restoring rack 50 slidably mounted in the upper end of the bracket 19, will engage a stop 51 whereby the rack 50 will be moved downwardly to operate a pinion 52 rotatably mounted within a recess 52a formed in the upper end of the bracket. The teeth of the pinion being in engagement with those of the toothed portion 35a of the rack 35 will cause the latter to be moved upwardly from the position shown in Fig. 3 to that shown in Fig. 2, during which time the rack will effect rotation of the gears 31 and 32 to restore the cutting tool to normal position, at which it will be held until the ram is again moved downwardly from the position shown in Fig. 2.

The stop 51 is in the form of a plunger guided in a bracket 53 adjustably mounted on the upright portion 45 of the frame 19 and clamped in adjusted position by the bolts 54, the heads of which engage said frame portion within a T-slot 45a formed therein. The pluger 51 is yieldably supported by means of a spring 55 within a housing 56 secured on the bracket 53. A nut 57 is threaded within the upper end of the housing to effect tensioning of the spring whereby to regulate the resistance offered by the plunger to the rack 50 for elevating the gear operating rack 35 to restore the tool to the position shown in Fig. 2 by rotation of the gears 31 and 32. The plunger is provided with a stem 58 extending through the nut 57 which operates to guide the plunger in its movement within the housing 56.

Figure 6:
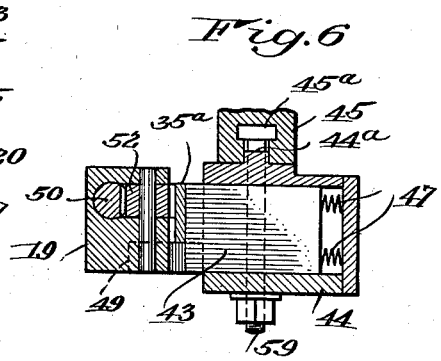
Fig. 6 is a horizontal section taken on line 6—6 of Fig. 5.

The housing 44 for the detent 43 is clamped upon the vertical portion 45 of the frame by means of a pair of bolts 59, the heads of which engage the frame portion 45 within the T-slot 45a thereof as shown in Fig. 6. By loosening the nuts of the bolts the housing and the detent therein can be adjusted vertically to engage the shoulder 46 of the rack 35 when the ram is at the end of its downward stroke, the point of which may be varied by varying the throw of the crank for raising and lowering the yoke 26. For example, with the detent in the position shown in Fig. 2, it will move into engagement with the shoulder 46 of the rack 35 when the ram reaches the lowermost position as shown in Fig. 1 at which the cutting tool is at the point 34c of the work. At this point the rack becomes fixed relative to the frame with the result that the gears 31 and 32 will begin to rotate to effect rotation of the tool. If, however, it is desired to produce a longer linear cut, this can be readily accomplished by increasing the throw of the crank 24 to increase the length of the stroke of the ram. In such a case the detent will be adjusted to engage the shoulder 46 of the rack with the ram at its lowest position, at which the detent will lock the rack to secure it against movement relative to the frame upon upward movement of the ram, during which time the tool will be rotated in engagement with the work. The detent housing 44 has a rib 44a on the back side thereof which extends within the slot 45a of the vertical portion 45 of the frame to guide and hold the housing against turning when adjusting it vertically upon the frame.

The rack 35 is frictionally held in engagement with the bracket 19 whereby to prevent the rack from shifting its position relative thereto under the influence of gravity when the ram is in the position shown in Fig. 2, thus preventing accidental rotation of the gears 31 and 32 and the consequent displacement of the tool before starting the cutting operaion.

In order to prevent any movement of the rack relative to the frame upon initial upward movement of the ram it is preferred to slightly taper the lower edge portion of the detent at the point where it contacts the shoulder 46 of the rack and also to slightly taper the shoulder to provide for a wedging action between the latter and the detent, thus insuring a uniform movement of the cutting point of the tool when reversing the direction of movement of the ram.

Any suitable means may be provided for frictionally maintaining the rack in the position shown at Fig. 2, such for example, as the friction shoe 60 disposed in engagement with the outer face of the bracket 19 and provided with a cup-shaped housing 61 within which is disposed a spring 62 engaging a follower 63 guided by the housing and mounted upon a bolt 64 threaded within the rack as shown in Fig. 3. The bolt has a nut 65 on its outer end for adjustment to vary the tension of the spring whereby to regulate the pressure exerted by the spring on the shoe 60 which will be sufficient for the purpose intended without preventing relative movement between the rack and the bracket 19 when the restoring parts 50, 51, and 52 operate to return the rack to initial starting position. The bracket 19 is provided with a slot 66 through which the bolt 64 extends, the slot being of sufficient length to provide for the necessary clearance between the bolt and the bracket.

It will be understood that the gears for rotating the cutting tool are preferably designed to move the cutting point of the tool at a rate of speed somewhat greater than that of the ram or support 15 when the latter is being returned to initial starting position. It will be further understood that cutting tools of different sizes may be used depending on the nature of the work and that the tool operating gears may be proportioned to vary the speed of the tools if desired.

Furthermore, the shape of the curve generated by the rotary cutting stroke of the tool may also be varied by relative variation between the speeds of the tool and the ram.

I claim:

1. In a machine of the class described, a frame, a support mounted to reciprocate on the frame, a tool mounted on the support for engagement with the work, means for causing the cutting portion of the tool to move into operative engagement with the work and in a straight line during movement of the support in one direction, and means operating automatically to continue to move the cutting portion of the tool in operative engagement with the work and in a curved path during movement of the support in another direction to a predetermined position, and means for moving the support on the frame in said different directions.

2. In a machine of the class described, a frame, a support mounted to reciprocate on the frame, a tool mounted on the support for operative engagement with the work during movement of the support in one direction, and means operating automatically when changing the direction to a predetermined position of movement of the support to move the tool relative to the support whereby to change the direction of movement of the tool and to maintain the tool in operative engagement with the work during movement of the support in said last mentioned direction.

3. In a machine of the class described, a frame, a support mounted to reciprocate on the frame, a tool mounted on the support for operative engagement with the work during movement of the support in one direction, means for holding the tool against movement relative to the support when moving the support in the last mentioned direction, and means on the support and the frame cooperating when changing the direction of movement of the support to change the direction of movement of the tool and to maintain the tool in operative engagement with the work during a portion of the period of movement of the support in said last mentioned direction.

4. In a machine of the class described, a frame, a support mounted to reciprocate on the frame, a tool mounted on the support, means for holding the tool in operative engagement with the work and against movement relative to the support during movement of the support in one direction, and means operating upon changing the direction of the movement of the support to rotate the tool in engagement with the work during a portion of the period of movement of the support in said last mentioned direction.

5. In a machine of the class described, a frame, a support reciprocally mounted on the frame, means for reciprocating the support, a cutting tool movable on the support, means for holding the tool in operative engagement with the work and against movement relative to the support during movement of the support in one direction, and means for moving the tool in a curved path and in operative engagement with the work during a portion of the period of movement of the support in the opposite direction.

6. In a machine of the class described, a frame, a support mounted for movement on the frame, means for moving the support from and to a predetermined position, a cutting tool mounted for rotation on the support, means for holding the tool in engagement with the work and against rotation during movement of the support from said predetermined position, and means for rotating the tool in operative engagement with the work during a portion of the period of return of the support to said predetermined position.

7. In a metal cutting machine, a frame, a support reciprocally mounted on the frame, a cutting tool movable on the support, means for holding the tool in operative engagement with the work and against movement relative to the support during movement of the support in one direction, operating means movable with the support for moving the tool relative thereto and in operative engagement with the work during movement of the support in the opposite direction, and means on the frame adapted to cooperate with said operating means to effect movement of the tool relative to the support and in engagement with the work during a portion of the period of movement of the support in the last mentioned direction.

8. In a metal cutting machine, a frame, a support reciprocally mounted on the frame, means for reciprocating the support, a cutting tool rotatably mounted on the support, means for holding the tool in operative engagement with the work and against rotation during movement of the support in one direction, means rotatable on the support for rotating the tool in operative engagement with the work during a portion of the period of movement of the support in the opposite direction, and means on the frame for cooperating with and effecting operation of the tool rotating means when moving the support in the last mentioned direction.

9. In a metal cutting machine, a frame, a support mounted for movement in different directions on the frame, operating means for the support, a cutting tool mounted for rotation on the support, means for holding the tool against rotation upon the support during movement of the support in one direction to perform a portion of the cutting operation of a single stroke of the tool, means for rotating the tool in operative engagement with the work during a portion of the period of movement of the support in another direction to complete the cutting stroke, and means for adjusting the tool to maintain the cutting point thereof in proper relation to the work.

10. In a metal cutting machine, a reciprocally mounted support, means for reciprocating the support, a cutting tool movable on the support, means for holding the tool at a predetermined operating position upon the support and against movement relative thereto during the advancing stroke of the support, means for automatically moving the tool relative to the support upon reversing the direction of movement of the support and serving to continue the tool in operative engagement with the work during a portion of the return stroke of the support to complete the cutting stroke of the tool, and means for cooperating with the tool moving means to restore the tool to said predetermined position when the support is nearing the end of its return stroke.

11. In a metal cutting machine, a frame, a reciprocally mounted support thereon, means for reciprocating the support, a cutting tool rotatably mounted on the support, means for holding the tool at a predetermined position upon the support and against rotation during the advancing stroke of the support, means for automatically effecting rotation of the tool and serving to retain it in operative engagement with the work upon reversing the direction of movement of the support and during a portion of the return stroke of the support to complete the cutting stroke of the tool, and means on the frame for cooperating with the tool rotating means to restore the tool to said predetermined position when the support is nearing the end of its return stroke.

12. In a machine of the class described, a frame, a support on the frame, means for moving the support from and to a predetermined position on the frame, a cutting tool movable on the support from a normal position thereon, means for holding the tool in operative engagement with the work and against movement relative to the support during movement of the latter from said predetermined position, means for moving the tool relative to the support and for retaining it in operative engagement with the work during a portion of the period of return of the support to said predetermined position whereby to complete the cutting stroke of the tool, and means on the frame for cooperation with said tool moving means to return the tool to normal position when the support is returned to said predetermined position.

13. In a machine of the class described, a frame, a support movable on the frame, means for moving the support from and to a predetermined position on the frame, a cutting tool movable on the support from a normal position thereon, an adjustable stop for holding the tool against movement relative to the support and in operative engagement with the work during movement of the support from said predetermined position, means for automatically moving the tool from engagement with the stop and relative to the support upon changing the direction of movement of the support and during a portion of the period of return of the support to said predetermined position to complete the cutting stroke, and means for cooperating with the tool moving means to move the tool into engagement with the stop when the support is returned to said predetermined position.

14. In a machine of the class described, a frame, a support movable on the frame, means for moving the support from and to a predetermined position on the frame, a cutting tool rotatably mounted on the support, a stop for holding the tool against rotation and in operative engagement with the work during movement of the support from said predetermined position to perform a portion of the cutting operation of a single stroke of the tool, means for rotating the tool on the support to complete the cutting stroke by continuing to advance the cutting portion of the tool in engagement with the working during a portion of the period of movement of the support to said predetermined position, and means on the frame for cooperating with the tool rotating means to move the tool into engagement with the stop when the support is returned to said predetermined position.

15. In a metal cutting machine, a frame, a support reciprocally mounted on the frame, a cutting tool rotatably mounted on the support, means on the support for holding the tool in operative engagement with the work and against rotation to perform a portion of the cutting operation of a single stroke of the tool when moving the support in one direction, gearing on the support for rotating the tool in operative engagement with the work to continue the cutting operation in order to complete the cutting stroke during a portion of the period of movement of the support in the opposite direction, and means including cooperating parts on the support and the frame for effecting rotation of the gearing upon reversing and moving the supporting in the opposite direction.

16. In a metal cutting machine, a frame, a support mounted for reciprocation upon the frame, means for reciprocating the support, a cutting tool mounted for rotation on the support, means on the support for holding the tool in operative engagement with the work and against rotation during movement of the support in one direction to perform a portion of the cutting operation of a single stroke of the tool, rotary means on the support for rotating the tool in operative engagement with the work to continue the cutting operation in order to complete the cutting stroke during a portion of the period of movement of the support in the opposite direction, a device movable with and relative to the support and adapted when held at a predetermined position to effect operation of said rotary means, and means on the frame for automatically locking said device at said position upon moving the support in the last mentioned direction.

17. In a metal cutting machine, a frame, a support reciprocally mounted on the frame, a cutting tool rotatably mounted on the support, means on the support for holding the tool in operative engagement with the work and against rotation when moving the support in one direction, gearing on the support for rotating the tool in operative engagement with the work when moving the support in the opposite direction, a rack on the support operatively associated with the gearing, said rack and support being mounted for relative movement, and means on the frame for engaging and holding the rack upon reversing and moving the support in the last mentioned direction whereby to rotate the gearing to effect rotation of the tool in engagement with the work.

18. In a metal cutting machine, a frame, a support reciprocally mounted on the frame, a cutting tool rotatably mounted on the support, means on the support for holding the tool in operative engagement with the work and against rotation during the advancing stroke of the support, gears on the support for rotating the tool in operative engagement with the work during the return stroke of the support, a rack on the support engaging one of the gears, said rack and support being mounted for relative movement, a member on the frame for engaging the rack at the end of the advancing stroke of the support, said member serving to lock the rack during a portion of the return stroke of the support whereby the gears will be operated to effect rotation of the cutting tool in engagement with the work, means on the support for moving said member to release the rack in advance of the completion of the return stroke of the support, and means including a part on the frame for restoring the rack to normal position relative to the gears when the support is approaching the end of its return stroke.

19. In a metal cutting machine, a frame, a support reciprocally mounted on the frame, a cutting tool rotatably mounted on the support, means on the support for holding the tool in operative engagement with the work and against rotation during the advancing stroke of the support, gears on the support for rotating the tool in operative engagement with the work during the return stroke of the support, a rack on the support engaging one of the gears, said rack and support being mounted for relative movement, a detent on the frame for automatically engaging the rack at the end of the advancing stroke of the support, said detent serving to hold the rack during a portion of the return stroke of the support whereby to effect operation of the gears to effect rotation of the cutting tool in engagement with the work, means on the support for moving the detent to release the rack in advance of the completion of the return stroke of the support, and means for restoring the rack to normal position relative to the gears, said means comprising a pinion operatively engaging the rack and a member slidable on the support and operatively connected with the pinion, and a part on the frame for engaging and moving said member at the end of the return stroke of the support.

20. In a machine of the class described, a frame, a support reciprocally mounted on the frame, gearing rotatably mounted on the support, a cutting tool connected with the gearing for rotation thereby, stop means for holding the tool at a predetermined position and against rotation during the advancing stroke of the support, a movable device for cooperation with the gearing to effect rotation thereof, means for automatically locking said device in operative position relative to the gearing at the end of the advancing stroke of the support whereby to cause the gearing to rotate the tool during a portion of the return stroke of the support to complete the cutting stroke of the tool, means operated by the support to release the locking means when the support is approaching the end of its return stroke, and means for operating said device subsequent to its release to effect operation of the gearing whereby to move the tool into engagement with the stop means.

21. In a device of the class described, a frame, a support reciprocally mounted on the frame, means for reciprocating the support, a gear housing on the support, intermeshing gears within the housing, a cutting tool fixed relative to one of the gears and adapted to be rotated thereby, stop means for holding the tool against rotation at a predetermined position of the tool during the advancing stroke of the support, a rack slidably mounted on the support and extending within the housing in engagement with the teeth of one of the gears, means on the frame for automatically locking the rack at the end of the advancing stroke of the support whereby to cause the last mentioned gear to travel on the rack during a portion of the return stroke of the support to effect rotation of the tool, means on the frame for releasing the locking means during the return stroke of the support and subsequent to the completion of the cutting stroke of the tool, a pinion on the support engaging the upper end of the rack, a second rack operatively associated with the pinion, and a yieldably mounted stop on the frame adapted to engage and operate the last mentioned rack when the support is approaching the end of its return stroke whereby to raise the first mentioned rack to operate the gearing to return the tool into engagement with said stop means.

22. In a device of the class described, a frame, a support reciprocally mounted on the frame, means for reciprocating the support, a gear housing on the support, intermeshing gears within the housing, a cutting tool fixed relative to one of the gears and adapted to be rotated thereby, stop means for holding the tool against rotation at a predetermined position of the tool during the advancing stroke of the support, a rack slidably mounted on the support and extending within the housing in engagement with the teeth of one of the gears, means on the frame for automatically locking the rack at the end of the advancing stroke of the support whereby to cause the last mentioned gear to travel on the rack during a portion of the return stroke of the support to effect rotation of the tool, means on the frame for releasing the locking means during the return stroke of the support and subsequent to the completion of the cutting stroke of the tool, a pinion on the support engaging the upper end of the rack, a second rack operatively associated with the pinion, a yieldably mounted stop on the frame adapted to engage and operate the last mentioned rack when the support is approaching the end of its return stroke whereby to raise the first mentioned rack to operate the gearing to return the tool into engagement with said stop means, and yieldably mounted means for frictionally holding the first mentioned rack in engagement with the support at different positions of the rack.

23. In a machine of the class described, a frame, a support reciprocally mounted on the frame, a cutting tool movably mounted on the support, means for holding the tool in operative engagement with the work and against movement on the support during movement of the support in one direction to perform a portion of the cutting operation of a single stroke of the tool, and means operating automatically upon movement of the support in another direction to change the direction of movement of the tool, said means serving to maintain the tool in operative engagement with the work and to move the tool relative to the support to complete the cutting stroke during movement of the support in the last mentioned direction to a predetermined position.

24. In a machine of the class described, a frame, a support reciprocally mounted on the frame, a cutting tool movable on the support for operation in engagement with the work during reciprocation of the support to first produce a straight line cut and then a curved cut at one stroke of the tool, means for reciprocating the support, means on the support for holding the tool in operative engagement with the work during the advancing stroke of the support, and means operating automatically upon completion of the advancing stroke of the support to move the cutting portion of the tool in a curved path and in operative engagement with the work during return of the support to a predetermined position on the frame whereby to complete the cutting stroke.

WILLIAM H. WELCH.